UNITED STATES PATENT OFFICE.

HENRY J. KUHLMAN, OF COLESBURG, IOWA.

APPARATUS FOR LIFTING PIPES.

1,412,182.   Specification of Letters Patent.   Patented Apr. 11, 1922.

Application filed August 9, 1920. Serial No. 402,186.

*To all whom it may concern:*

Be it known that I, HENRY J. KUHLMAN, a citizen of the United States of America, and a resident of Colesburg, Delaware County, Iowa, have invented certain new and useful Improvements in Apparatus for Lifting Pipes, of which the following is a specification.

My invention relates to improvements in apparatus for elevating pipes, and the object of my improvement is to supply a device suitable for convenient operation in lifting pipes from their casings in drilled wells or the like, which will not only perform its function without side strain on the pipe, but which will permit the uncoupling of the pipe sections successively as raised, means being provided to prevent subsidence of lower sections when disconnected from the device.

Figures 1, 2:
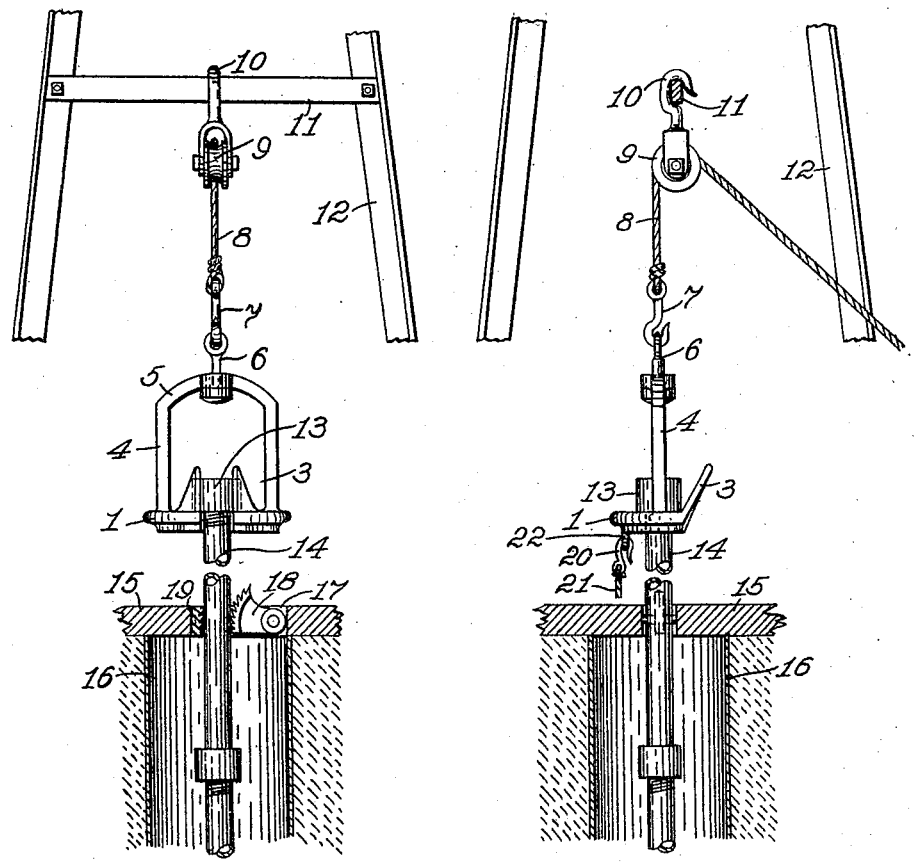
Figure 3:
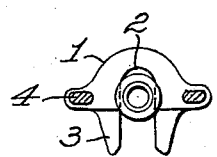

This object I have accomplished by the means which are hereinafter described and claimed, and which are illustrated in the accompanying drawings, in which Fig. 1 is an elevation of my improved apparatus for elevating pipe, with parts of the supporting means and of the pipe broken away, and the well-casing shown in vertical section; Fig. 2 is a like view of the apparatus, taken at an angle of ninety degrees from that shown in said Fig. 1, and Fig. 3 is a plan view of the coupling engaging device, with the bail thereof in horizontal section.

Similar numerals of reference denote corresponding parts throughout the several views.

In the drawings, the numeral 16 denotes a cylindrical or tubular well-casing containing pipe-sections 14 connected together by means of the coupling members 13, and 15 is a covering platform having a slotted orifice 17 through which the pipe extends upwardly. In one end of the opening 17 is fixed a toothed block 19 with upwardly-inclined teeth, while in said opening at the opposite side of the pipe 14 is pivotally mounted a toothed sector 18 with upwardly-inclined teeth. The pipe is grasped and held between the teeth of the fixed block 19 and of the sector 18 in such wise that the pipe may be moved upwardly, the sector yielding upwardly, but being held from subsidence on account of the upwardly inclined teeth of the block and sector cooperating to grasp the pipe between them.

My improved lifting apparatus comprises a clip or engaging-coupling 1, in the form of a split-ring or recessed body having upwardly inclined guide-fingers 3 at each side of its lateral opening, and having a fixed upright bail 4. The middle of the bail is vertically orificed to receive a swivel eye-bolt 6. The eye of this bolt receives a hook 7 on one end of a cable 8, the latter being passed over a sheave 9 in a pulley-block having a fixed hook 10 supported upon a cross-bar 11 of the standards 12 of a windmill structure, or of any other supporting means. The cable may have a draft-connection (not shown) at its other end, whereby power may be applied to cause a lifting action upon the engaging-coupling or split-ring 1.

The ring 1 has on its under side, opposite the lateral opening of its central orifice 2, a depending integral loop 22 adapted to receive a hook 20 on a hanging cable 21, the latter being used to draw the ring down after elevation, or to swing it in any desired direction.

The ring 1 is applied to engage a pipe-coupling 13 by simply positioning it to have its opening 2 encompass the pipe 14 beneath the coupling 13, and when traction is applied to the cable 8, the coupled pipe-sections are lifted bodily upwardly from the casing 16. The clutch-members 19 and 18 will hold a lower pipe-section after an upper section has been raised by the apparatus, so that the upper section may be uncoupled, swung out of the way and the ring 1 pulled down by the cable 21 and then engaged with the coupling on the lower section, and so on successively until all the sections have been elevated and removed.

It will be observed that the opening 2 of the ring 1 is centrally disposed about the pipe 14, and the upper inner edges of the ring engage equally upon the under edge of the coupling 13, creating a balanced tension thereon, free from side strain. This prevents bending of or injury to the pipe or its couplings, as often happens when engaging means are applied to the pipe from one side.

The ring 1 is quickly and easily applied, since the guide-fingers 3 prevent escape of the coupling after engagement with the ring.

Having described my invention, what I claim as new, and desire to secure by Letters Patent, is:

1. Apparatus for shifting pipe, comprising a split-ring with upwardly inclined guide fingers removably supporting a coupling mounted on a pipe, and means positioned in line with said split-ring adapted to move it together with said pipe and coupling in one direction.

2. Apparatus for shifting pipe, comprising a split-ring clip with upwardly inclined guide fingers engaging removably a coupling on a pipe, a draft-connection to said clip adapted to pull it and the pipe longitudinally without side strain, and clutch-members engaged with said pipe adapted to grip it and prevent its movement in one direction only.

3. Apparatus for shifting pipe, comprising a split-ring with upwardly inclined guide fingers connected removably to one end of a pipe for gripping it without side strain, including a draft-connection for imparting movement to the pipe in one direction, and a draft-connection to said first-mentioned means operative to impart movement thereto in an opposite direction when released from said pipe.

Signed at Waterloo, Iowa, this 23rd day of July, 1920.

HENRY J. KUHLMAN.